United States Patent
Ogawa et al.

(10) Patent No.: US 10,713,637 B2
(45) Date of Patent: Jul. 14, 2020

(54) REGISTRATION SETTLEMENT APPARATUS

(71) Applicant: TOSHIBA TEC KABUSHIKI KAISHA, Shinagawa-ku, Tokyo (JP)

(72) Inventors: Yuichi Ogawa, Izunokuni Shizuoka (JP); Takashi Muraoka, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/509,646

(22) Filed: Jul. 12, 2019

(65) Prior Publication Data
US 2020/0034811 A1    Jan. 30, 2020

(30) Foreign Application Priority Data
Jul. 25, 2018 (JP) .................. 2018-139634

(51) Int. Cl.
*G06K 15/00* (2006.01)
*G06Q 20/20* (2012.01)
*A47F 9/04* (2006.01)

(52) U.S. Cl.
CPC .......... *G06Q 20/208* (2013.01); *A47F 9/046* (2013.01); *G06Q 20/204* (2013.01); *G06Q 20/206* (2013.01); *G06Q 20/209* (2013.01)

(58) Field of Classification Search
CPC ................................... G06Q 30/06
USPC .............. 235/379, 383; 705/35, 39
See application file for complete search history.

(56) References Cited

U.S. PATENT DOCUMENTS

| | | | | |
|---|---|---|---|---|
| 7,974,926 | B2* | 7/2011 | Ohmori | G06Q 20/10 705/39 |
| 8,256,672 | B2* | 9/2012 | Haibara | G06Q 30/06 235/375 |

FOREIGN PATENT DOCUMENTS

JP          2010-86202        4/2010

* cited by examiner

*Primary Examiner* — Jamara A Franklin
(74) *Attorney, Agent, or Firm* — Amin, Turocy & Watson, LLP

(57) ABSTRACT

A registration settlement apparatus comprises a first determination module that determines a commodity in response to an operation by a first operator; a second determination module that determines a commodity in response to an operation by a second operator; a determination control module that controls the first and second determination modules to enable either the first or the second determination module, and enables the second determination module in response to an instruction from the second operator while the first determination module is enabled within a registration period for one transaction; a creation module that creates a list of commodities determined as objects of the transaction within the registration period by the first or the second determination module enabled; and a settlement module that calculates a settlement amount based on the list created and performs settlement processing on the settlement amount in response to an operation by the first operator.

20 Claims, 9 Drawing Sheets

FIG.9

<<<OOO BEER 350ml BOTTLE>>>

THIS COMMODITY REQUIRES OPERATION OF THE STORE CLERK.

PLEASE SCAN REMAINING COMMODITY FIRST AND THEN TOUCH SETTLEMENT BUTTON.

THEN, THE STORE CLERK WILL DEAL WITH IT.

FIG.10

THERE IS A COMMODITY WHOSE REGISTRATION IS WITHHELD.

PLEASE ADDITIONALLY REGISTER IT BY OPERATION IN SEMI-SELF-SERVICE MODE.

[ SELF-SERVICE SWITCHING ] — BU21

REGISTRATION SETTLEMENT APPARATUS

CROSS-REFERENCE TO RELATED APPLICATION

This application is based upon and claims the benefit of priority from Japanese Patent Application No. 2018-139634, filed on Jul. 25, 2018, the entire contents of which are incorporated herein by reference.

FIELD

Embodiments described herein relate generally to a registration settlement apparatus.

BACKGROUND

A self-service type registration settlement apparatus is known in which a customer performs both a registration operation for contents of a transaction such as registering a purchased commodity in a commodity list and a settlement operation on the transaction.

However, if it is difficult for the customer to perform the registration operation due to be unfamiliar with such type of the apparatus, or if the purchased commodity is prohibited to be sold through the registration operation performed by the customer, it is necessary for a store clerk to perform the registration operation in place of the customer.

For these reasons described above, it is desired to easily switch an operation mode of the registration settlement apparatus between a so-called full-self-service mode in which the customer performs all operations from registration to settlement and a so-called semi-self-service mode in which the store clerk firstly performs the registration operation and then the customer performs the settlement operation.

DESCRIPTION OF THE DRAWINGS

FIG. 9 is a diagram illustrating a notification screen; and

FIG. 10 is a diagram illustrating a call screen.

DETAILED DESCRIPTION

In accordance with an embodiment, a registration settlement apparatus comprises a first determination module configured to determine a commodity as an object of a transaction in response to an operation performed by a first operator; a second determination module configured to determine the commodity as an object of the transaction in response to an operation performed by a second operator facing the first operator across the registration settlement apparatus; a determination control module configured to control the first determination module and the second determination module so as to enable either of the both, and enable the second determination module in response to an instruction from the second operator while the first determination module is enabled within a registration period for one transaction; a creation module configured to create a list of commodities determined as objects of the transaction within the registration period by the first determination module or the second determination module enabled by the determination control module; and a settlement module configured to calculate a settlement amount based on the list created by the creation module and perform a settlement processing on the settlement amount in response to an operation performed by the first operator.

Hereinafter, an embodiment is described with reference to the accompanying drawings. In the present embodiment, a POS (Point Of Sales) terminal is described as a registration settlement apparatus.

Figure 1:
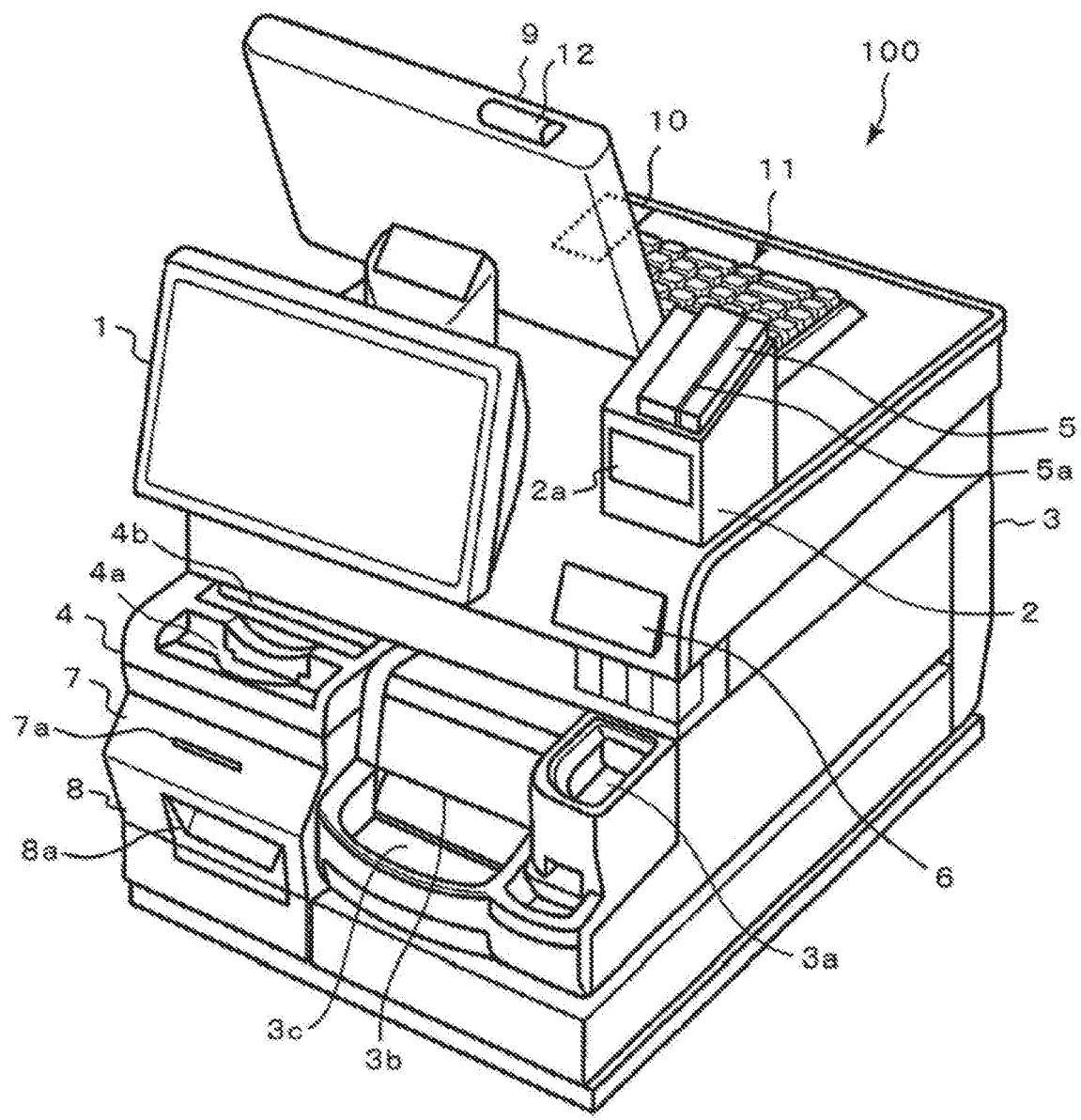
FIG. 1 is a perspective view illustrating an external appearance of a POS terminal according to an embodiment.

FIG. 1 is a perspective view illustrating an external appearance of a POS terminal 100 according to the present embodiment.

The POS terminal 100 is installed on a checkout counter which separates a workspace of a store clerk from a sales floor. The POS terminal 100 is operated by the store clerk and the customer. The store clerk who operates the POS terminal 100 is present on a right rear side in FIG. 1. The customer who operates the POS terminal 100 is present on a left front side in FIG. 1. Thus, in the following, the right rear side in FIG. 1 is referred to as a store clerk side, and the left front side is referred to as a customer side.

The POS terminal 100 includes a touch panel for customer 1, a fixed scanner 2, a coin unit 3, a bill unit 4, a credit card reader 5, a near field communication unit 6, a prepaid card reader/writer (prepaid card R/W) 7, a receipt printer 8, a touch panel for store clerk 9, a sub touch panel 10, a keyboard 11 and a lamp 12.

The touch panel for customer 1 is oriented towards the customer side as shown in FIG. 1. The touch panel for customer 1 displays a screen for providing information to a customer. The touch panel for customer 1 receives an instruction input through a touch operation on the screen by the customer.

The fixed scanner 2 has a reading window 2a facing the customer side. The fixed scanner 2 photographs a commodity held in front of the reading window 2a to recognize barcode information represented by a barcode attached to the commodity by performing image processing. Then, the fixed scanner 2 outputs the recognized barcode information to a later-described processor 13. The fixed scanner 2 may be another type of known device such as a device optically reading a barcode from the reflection of a laser beam emitted to the barcode. The fixed scanner 2 may also be a known device having a function of specifying a commodity using an object recognition technology from an image of the commodity obtained by photographing the commodity.

The coin unit 3 includes a coin insertion slot 3a, a coin discharge port 3b and a coin tray 3c. The coin insertion slot 3a is formed in such a manner that coins can be inserted from the customer side. The coin unit 3 accommodates the coins inserted from the coin insertion slot 3a in an internal storage while counting the coins by denomination. The coin unit 3 discharges coins accommodated in the storage to the coin tray 3c via the coin discharge port 3b. The coin tray 3c is formed in such a manner that coins can be taken out from the customer side.

The bill unit 4 includes a bill insertion slot 4a and a bill discharge port 4b. The bill insertion slot 4a is formed in such a manner that bills can be inserted from the customer side. The bill unit 4 accommodates the bills inserted from the bill insertion slot 4a in an internal storage while counting the bills by denomination. The bill unit 4 discharges bills accommodated in the storage from the bill discharge port 4b. The bill discharge port 4b holds the discharged bill in a state in which a part thereof is exposed to the outside. The bill discharge port 4b is formed in such a manner that the bills held as described above can be taken out from the customer side.

The credit card reader 5 reads card information from a credit card slid along a slit 5a. The credit card reader 5 is arranged in such a manner that the slit 5a faces the customer side so that it is suitable for a customer present on the customer side to slide the credit card.

The near field communication unit 6 is provided to form a communication range on the customer side. The near field communication unit 6 carries out near field wireless communication with a wireless tag in proximity from the customer side to acquire data stored in the wireless tag. The near field communication unit 6 writes information to the above-described wireless tag through the above-described near field wireless communication.

The prepaid card reader/writer 7 includes a slot 7a. The prepaid card reader/writer 7 reads card data magnetically recorded on a prepaid card inserted in the slot 7a. The prepaid card reader/writer 7 writes data to the prepaid card inserted in the slot 7a.

The receipt printer 8 prints a receipt image on a receipt paper. The receipt printer 8 discharges the receipt paper on which the receipt image is printed from a receipt discharge port 8a to the outside.

The touch panel for store clerk 9 is oriented towards the store clerk side. The touch panel for store clerk 9 displays a screen for providing information to a store clerk. The touch panel for store clerk 9 receives an instruction input through a touch operation on the screen by the store clerk.

The sub touch panel 10 is oriented towards the store clerk side. The sub touch panel 10 displays a screen for providing information to the store clerk. The sub touch panel 10 receives an instruction input through a touch operation on the screen by the store clerk.

The keyboard 11 includes a large number of keys arranged to be easily operated by the store clerk present on the store clerk side. The keyboard 11 receives an instruction of the store clerk input through pressing these keys.

The lamp 12 is lit up. The lamp 12 is provided on the top of the touch panel for store clerk 9 so that a person who is distant from the POS terminal 100 can see the lamp which comes on. The lamp may be mounted in the POS terminal 100 in any way as long as the light emitted therefrom can be viewed by the person as described above.

Figure 2:
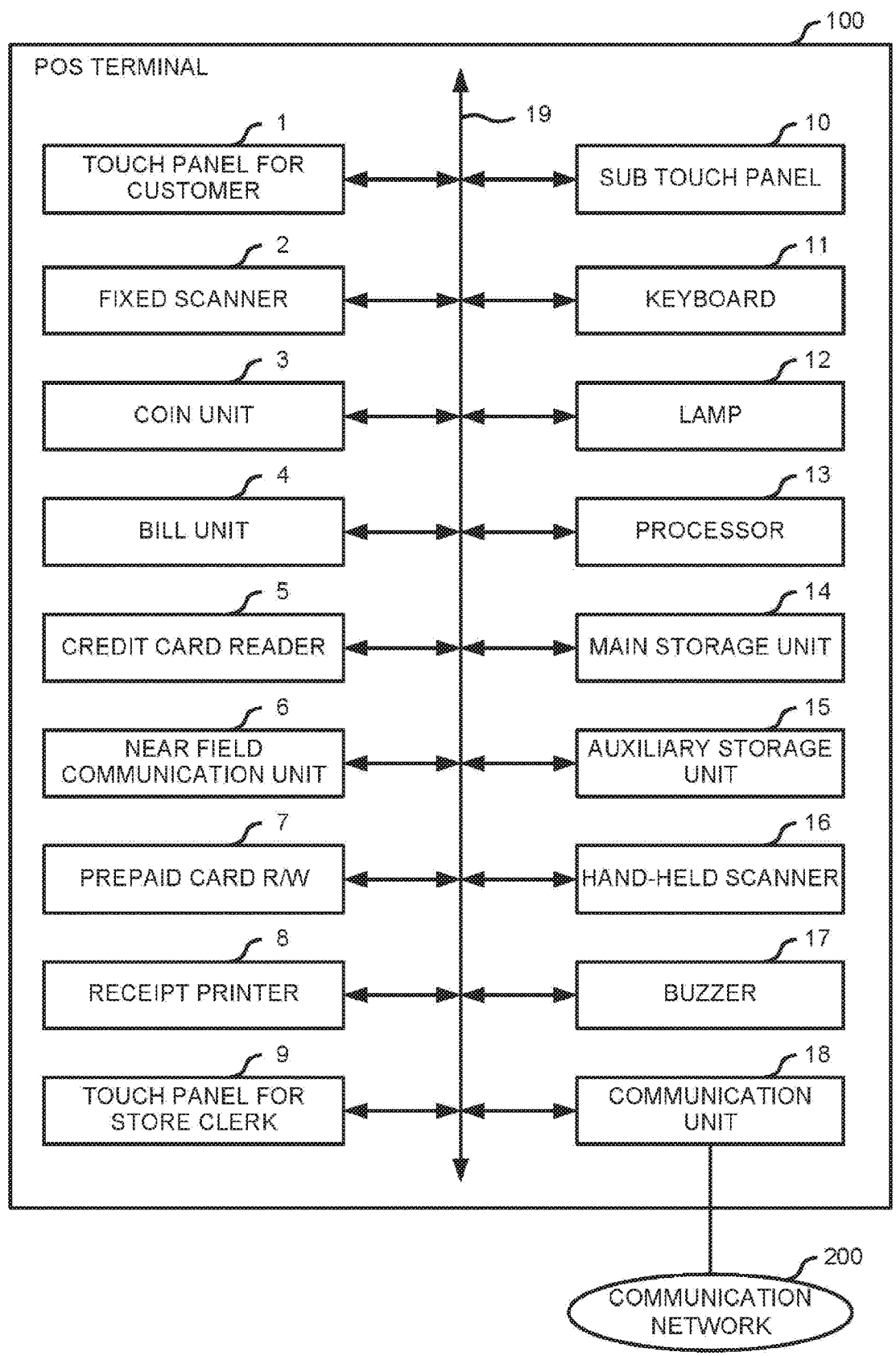
FIG. 2 is a block diagram illustrating a circuit configuration of main components of the POS terminal shown in FIG. 1.

FIG. 2 is a block diagram illustrating a circuit configuration of main components of the POS terminal 100. In FIG. 2, the components the same as those shown in FIG. 1 are denoted with the same reference numerals, and the detailed description thereof is omitted.

In addition to the components also shown in FIG. 1, the POS terminal 100 further includes a processor 13, a main storage unit 14, an auxiliary storage unit 15, a hand-held scanner 16, a buzzer 17, a communication unit 18 and a transmission line 19.

The components also shown in FIG. 1, the processor 13, the main storage unit 14, the auxiliary storage unit 15, the hand-held scanner 16, the buzzer 17 and the communication unit 18 are connected to the transmission line 19.

The processor 13, the main storage unit 14 and the auxiliary storage unit 15 connected via the transmission line 19 constitute a computer executing information processing for controlling the POS terminal 100.

The processor 13 acts as a central component of the computer. The processor 13 executes information processing programs such as application programs stored in the main storage unit 14 and/or the auxiliary storage unit 15 according to an operating system (OS) and middleware to control each section of the POS terminal 100 to perform various functions of the POS terminal 100.

The main storage unit 14 acts as a main memory component of the computer. The main storage unit 14 includes a nonvolatile memory area and a volatile memory area. The main storage unit 14 stores the information processing programs in the nonvolatile memory area. The main storage unit 14 may also store data necessary for the processor 13 to execute various types of information processing in the nonvolatile memory area or the volatile memory area. The main storage unit 14 uses the volatile memory area as a work area where data is appropriately rewritten by the processor 13.

The auxiliary storage unit 15 acts as an auxiliary memory component of the computer. The auxiliary storage unit 15 is, for example, an EEPROM (Electric Erasable Programmable Read-Only Memory), an HDD (Hard Disc Drive), an SSD (Solid State Drive), or the like. The auxiliary storage unit 15 stores data used by the processor 13 to perform various types of information processing and data generated in a processing performed by the processor 13. The auxiliary storage unit 15 may also store the information processing program.

The hand-held scanner 16 is held by an operator to optically scan a barcode facing a reading port thereof. The hand-held scanner 16 outputs barcode information represented by the scanned barcode to the processor 13.

The buzzer 17 issues various kinds of sound such as a warning sound that a person in vicinity of the POS terminal 100 can hear.

The communication unit 18 performs communication processing for allowing the processor 13 to transmit and receive various kinds of data to and from a device such as a POS server via the communication network 200. The communication network 200 is typically an LAN (Local Area Network). However, the communication network 200 may also be the Internet, a VPN (Virtual Private Network), public communication network, or mobile communication, or a combination of those as appropriate in addition to the LAN. The communication unit 18 may be a known device conforming to a communication system of the communication network 200.

The transmission line 19 includes an address bus, a data bus, a control signal line, and the like. The transmission line 19 transmits data and signals transmitted and received between the connected sections.

The hardware of an existing POS terminal 100 may be used as the basic hardware of the POS terminal 100, for example. The POS terminal 100 is generally transferred in a state in which the information processing program for implementing the information processing described later is stored in the main storage unit 14 or the auxiliary storage unit 15. However, in a state in which the information processing program is not stored in the main storage unit 14 or the auxiliary storage unit 15, the hardware of the POS terminal 100 and the information processing program may be separately transferred. The information processing program may be written in the main storage unit 14 or the auxiliary storage unit 15 in response to an operation by an administrator of the POS terminal 100. The information processing program may be transferred by recording it on a removable recording medium such as a magnetic disk, a magneto-optical disk, an optical disk, a semiconductor memory, etc., or through communication via the network.

Next, the operation of the POS terminal 100 configured as described above is described.

When the POS terminal 100 is started in an operation mode for registration and settlement, the processor 13 performs information processing described below by executing the information processing program stored in the main storage unit 14 or the auxiliary storage unit 15.

Figure 3:
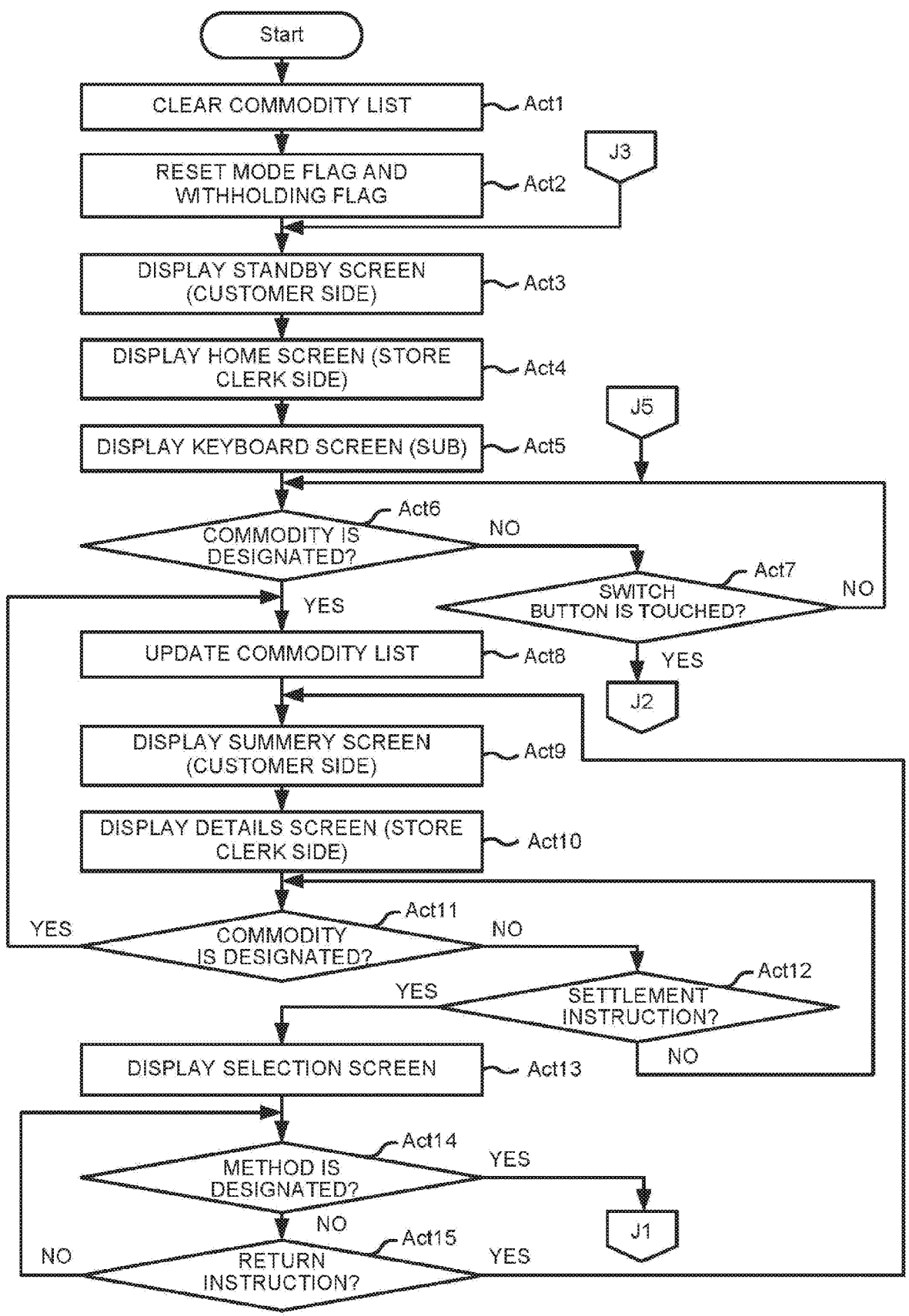
FIG. 3 is a flowchart depicting information processing performed by a processor in FIG. 2.
Figure 4:
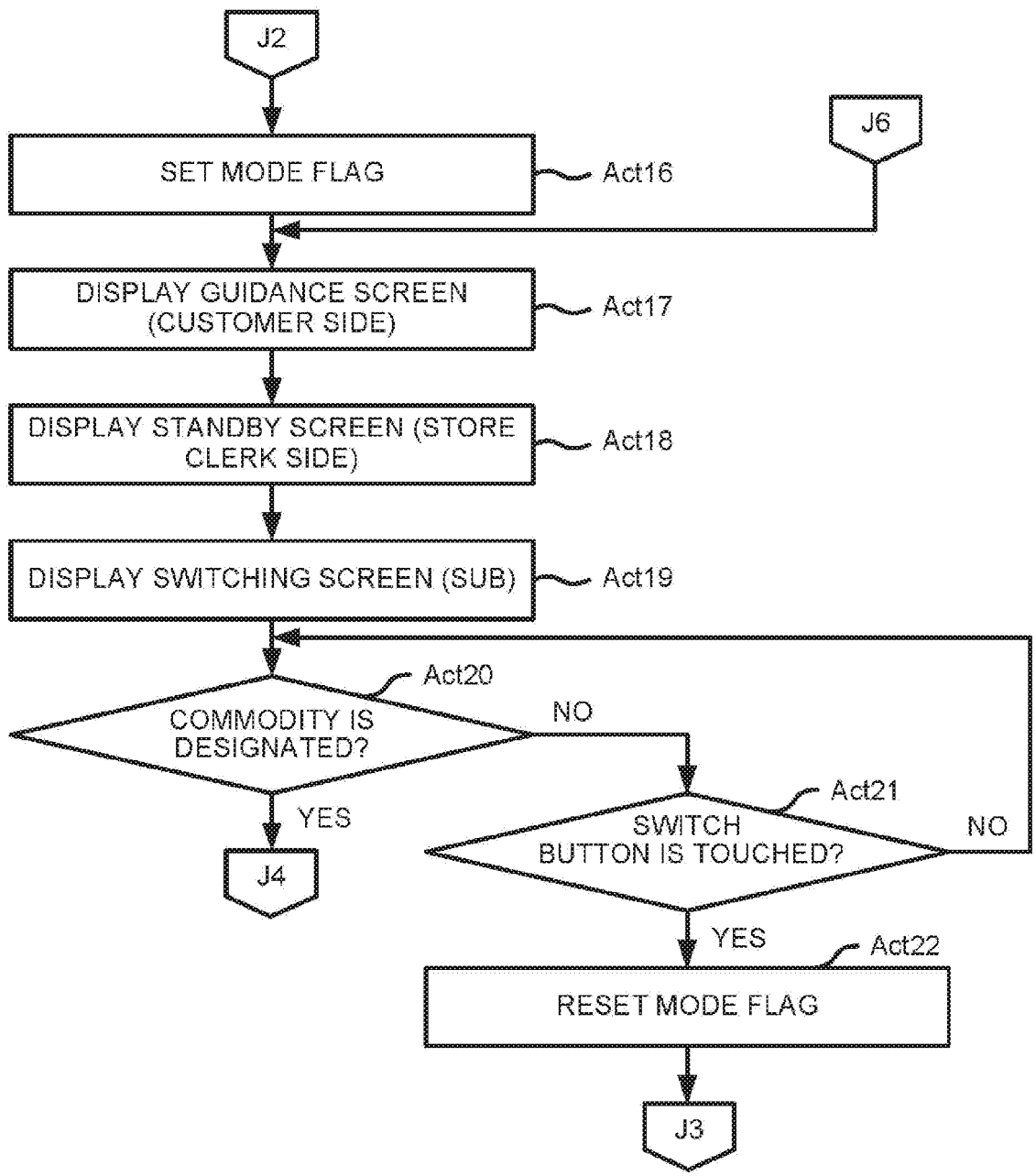
FIG. 4 is a flowchart depicting information processing performed by the processor in FIG. 2.
Figure 5:
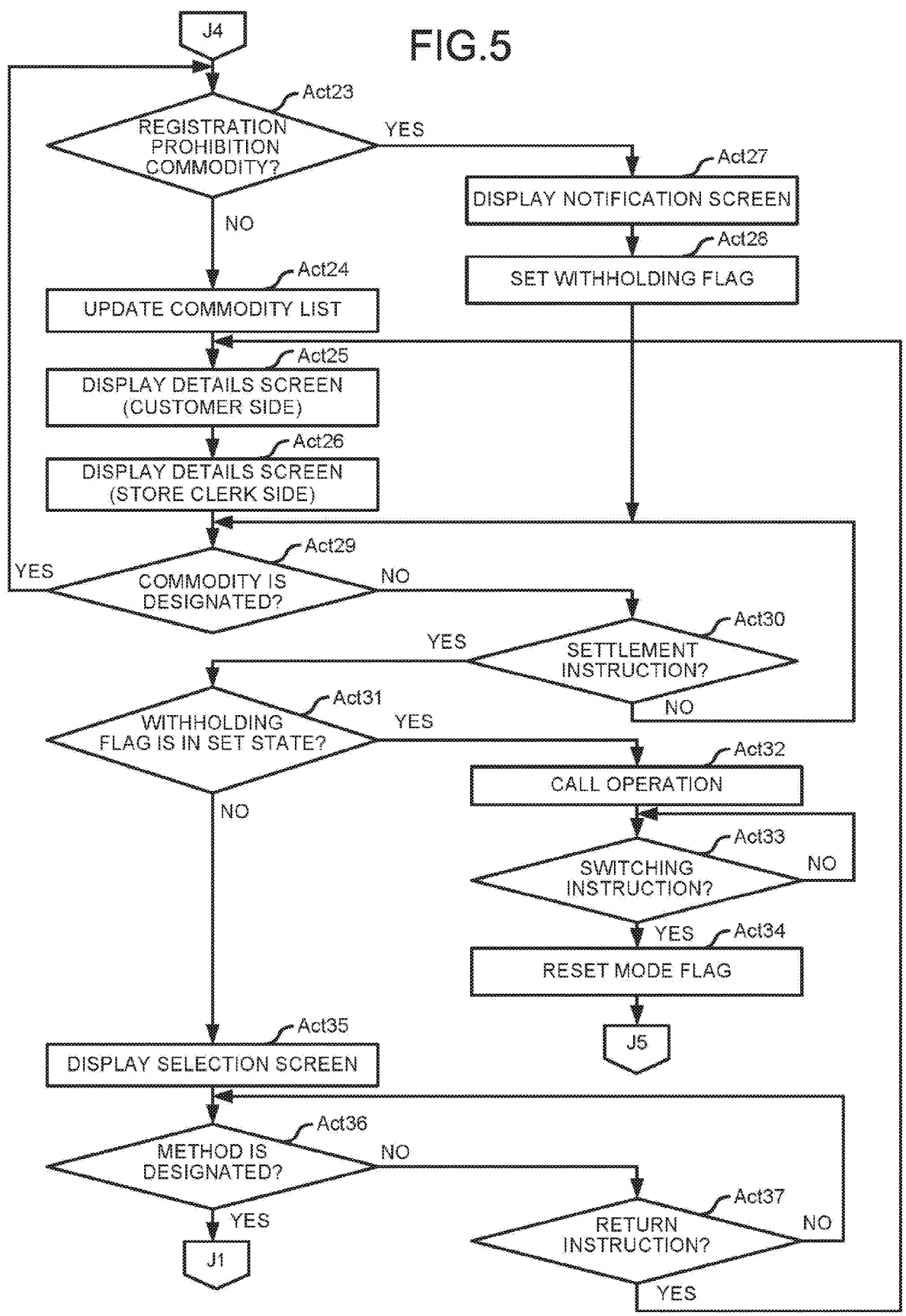
FIG. 5 is a flowchart depicting information processing performed by the processor in FIG. 2.

FIG. 3, FIG. 4 and FIG. 5 are flowcharts depicting information processing performed by the processor 13. The contents of the processing described below are merely an example, and can be appropriately changed by changing an order of a part of processing, omitting a part of processing or adding another processing.

The processor 13 clears a commodity list in Act 1. The commodity list indicates a list of commodities registered as purchased commodities. The commodity list is stored in the main storage unit 14 or the auxiliary storage unit 15.

The processor 13 resets a mode flag and a withholding flag in Act. The mode flag indicates that a semi-self-service mode is applied at the time it is in a reset state, and that a full-self-service mode is applied at the time it is in a set state. The withholding flag indicates that the registration of a registration prohibition commodity described below is retained at the time it is in the set state. The mode flag and the withholding flag are stored in the main storage unit 14 or the auxiliary storage unit 15. Specifically, the processor 13 sets the semi-self-service mode immediately after starting the operation in the above-mentioned operation mode. As described later, in the semi-self-service mode, the operation on the store clerk side is not restricted as compared to the full-self-service mode.

In Act 3, the processor 13 controls the touch panel for customer 1 to display a standby screen. Although contents of the standby screen are not limited, for example, it is assumed that the standby screen shows an advertisement. The standby screen does not include an operation element for registering the purchased commodity.

The processor 13 controls the touch panel for store clerk 9 to display a home screen in Act 4. The home screen is a basic screen for the store clerk to perform a registration operation for the purchased commodity. The store clerk can perform an operation to designate a commodity as the purchased commodity on the home screen or another screen that can be transferred from the home screen.

The processor 13 controls the sub touch panel 10 to display a keyboard screen in Act 5. The keyboard screen shows a software keyboard formed by arranging a plurality of images each imitating a button (hereinafter, referred to as buttons). Various functions are assigned to the plurality of buttons, and the plurality of buttons becomes operators for designating the functions assigned thereto.

Figure 7:
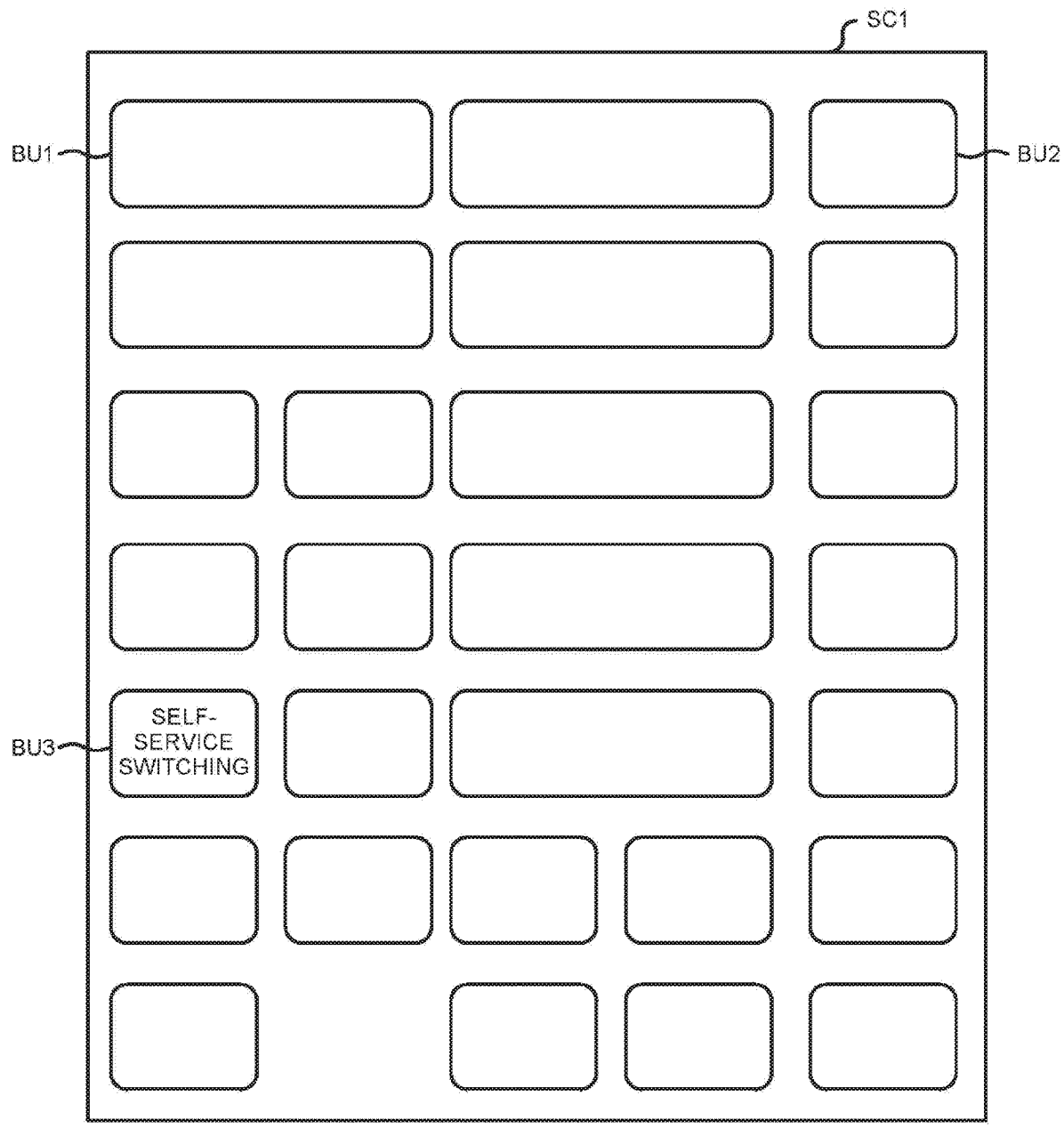
FIG. 7 is a diagram illustrating a keyboard screen.

FIG. 7 is a diagram illustrating a keyboard screen SC1.

On the keyboard screen SC1, a plurality of buttons such as a button BU1 and a button BU2 is arranged. Although no reference numeral is applied, those shown in the same shape as the button BU1 or the button BU2 are all buttons.

The functions are previously assigned to respective buttons on the keyboard screen SC1. A switch button BU3 is assigned with a function for instructing switching to the full-self-service mode by the operator. In the switch button BU3, a character string "self-service switching" is shown to indicate the assigned function. A character string indicating a function assigned to each of the other buttons is actually shown on the corresponding button, but the character string is not shown in FIG. 7.

In Act 6, the processor 13 determines whether or not a commodity to be registered as the purchased commodity is designated. Then, if no commodity is designated, the processor 13 takes No and proceeds to the processing in Act 7.

In Act 7, the processor 13 determines whether or not the switch button BU3 is touched. Then, if it is determined that the switch button BU3 is not touched, the processor 13 takes No and thus returns to the processing in Act6.

Thus, the processor 13 stands by until the commodity is designated in Act 6 or the switch button BU3 is touched in Act 7.

The processor 13 may also determine whether or not another instruction operation is performed in the standby state and another standby state described below. Then, if it is determined that such an instruction operation is performed, the processor 13 shifts to a processing corresponding to the operation.

The customer picks up a commodity to be purchased from a sales floor, e.g., a showcase, for example, to bring it to the checkout counter. The store clerk who operates the POS terminal 100 is present on a workspace side across the POS terminal 100 with respect to the customer present on a sales floor side. The store clerk uses the touch panel for store clerk 9 or the hand-held scanner 16 to designate the commodity that the customer brings to the checkout counter as the purchased commodity. The operation performed by the store clerk at this time may be the same as that performed in another existing POS terminal. If the commodity is designated as the purchased commodity, the processor 13 takes Yes in Act 6 and proceeds to the processing in Act 8.

Since the standby screen does not include the operation element for registering the purchased commodity as described above, the operation for designating the commodity as the purchased commodity is not performed with the touch panel for customer 1. The processor 13 does not adopt a recognition result from the fixed scanner 2 in the registration of the purchased commodity. In other words, the processor 13 disables the touch panel for customer 1 and the fixed scanner 2 in the semi-self-service mode. By disabling the touch panel for customer 1 and the fixed scanner 2 as described above, it can be prevented that the purchased commodity is erroneously registered by an operation performed by the customer.

In Act 8, the processor 13 updates the commodity list to include the commodity designated by the above-described operation. The commodity list includes, for example, a list of commodity codes for identifying the commodities. Therefore, the processor 13 adds a commodity code for identifying the designated commodity to the commodity list.

The processor 13 controls the touch panel for customer 1 to display a summary screen in Act 9. The summary screen shows a summary of the current status for the registration of the purchased commodity according to contents of the commodity list as of this time. The summary screen shows, for example, a commodity name, unit price and quantity of the commodity registered as the purchased commodity just before, a total discount amount applied to registered commodities, and a total amount of the registered commodities. The summary screen does not include an operation element for registering the purchased commodity.

In Act 10, the processor 13 controls the touch panel for store clerk 9 to display a details screen. The details screen shows details of the current status for the registration of the purchased commodity according to the contents of the commodity list as of this time. The details screen shows, for example, a list including a commodity name, unit price and quantity of each commodity registered as the purchased commodity, the total discount amount applied to the registered commodities, and the total amount of the registered commodities.

In Act 11, the processor 13 determines whether or not a commodity to be registered as the purchased commodity is designated. Then, if no commodity is designated, the processor 13 takes No and proceeds to the processing in Act 12.

In Act 12, the processor 13 determines whether or not settlement is instructed. Then, if it is determined that the settlement is not instructed, the processor 13 takes No and thus returns to the processing in Act 11.

Thus, the processor 13 stands by until the commodity is designated in Act 11 or the settlement is instructed in Act 12.

In a case in which the customer brings a plurality of commodities to the checkout counter, the store clerk performs an operation for designating the second and subsequent commodities as purchased commodities at the time the processor 13 is in the standby state in Act 11 and Act 12. If such an operation is performed, the processor 13 takes Yes in Act 11 and executes the processing in Act 8 to Act 10 in the same manner as described above. As a result, the plurality of commodities that the customer brings to the checkout counter is added to the commodity list, respectively. Since the summary screen does not include the operation element for registering the purchased commodity as described above, the operation for designating the commodity as the purchased commodity is not performed with the touch panel for customer 1. The processor 13 does not adopt the recognition result from the fixed scanner 2 in the registration of the purchased commodity.

Thus, the processor 13 determines a commodity as an object of the transaction in response to an operation performed by the store clerk acting as a second operator opposite to the customer acting as a first operator across the POS terminal 100. Thus, the processor 13 executes the information processing by executing the information processing program, and in this way, the computer having the processor 13 as a central component functions as a second determination module that makes the above determination.

The store clerk instructs the settlement by performing a predetermined operation on the touch panel for store clerk 9, the sub touch panel 10 or the keyboard 11 if all the commodities that the customer brings to the checkout counter are designated as the purchased commodities. The predetermined operation is, for example, an operation of pressing a customer layer key provided on the keyboard 11. The processor 13 takes Yes in Act 12 in response to the execution of the operation, and proceeds to the processing in Act 13.

The processor 13 controls the touch panel for customer 1 to display a selection screen in Act 13. The selection screen is used for receiving an operation performed by a customer who selects a settlement method. For example, the selection screen shows a plurality of buttons associated with a plurality of settlement methods, respectively. In the POS terminal 100 according to the present embodiment, cash, credit card, electronic money and prepaid card can be selectively used as the settlement method. For this reason, the selection screen includes four buttons associated with the cash, the credit card, the electronic money, and the prepaid card, respectively. A plurality of buttons associated with a plurality of settlement services respectively belonging to the electronic money and the prepaid card may be included.

Alternatively, when the button associated with the electronic money or the prepaid card is touched, the processor 13 may control the touch panel for customer 1 to display a selection screen in lower order for showing buttons respectively associated with the plurality of settlement services belonging to the selected settlement method.

In Act 14, the processor 13 determines whether or not the settlement method is designated. Then, if the settlement method is not designated, the processor 13 takes No and proceeds to the processing in Act 15.

In Act 15, the processor 13 determines whether or not the return to the registration of the purchased commodity is instructed. Then, if the return is not instructed, the processor 13 takes No and thus returns to the processing in Act 14.

Thus, the processor 13 stands by until the settlement method is designated in Act 14 or the return to the registration is instructed in Act 15.

If the customer wants to add the purchased commodity, the customer instructs to return to the registration by performing a predetermined operation on the touch panel for customer 1. The predetermined operation is, for example, a touch on a return button displayed on the selection screen. The store clerk instructs to return to the registration by performing a predetermined operation on the touch panel for store clerk 9, the sub touch panel 10 or the keyboard 11 if there is a purchased commodity that is not registered yet. The predetermined operation is, for example, a touch on the return button displayed on the details screen or the keyboard screen. The processor 13 takes Yes in Act 15 in response to the corresponding operation, and executes the processing subsequent to Act 9 in the same manner as described above.

At the time of settlement, the customer designates the settlement method to be used by performing a predetermined operation on the selection screen. The predetermined operation is, for example, a touch on a button, displayed on the selection screen, which is associated with the settlement method designated. The processor 13 takes Yes in Act 14 in response to the corresponding operation, and proceeds to the processing in Act 38 in FIG. 6.

If it is desired to set the operation mode of the POS terminal 100 to the full-self-service mode, the store clerk touches the switch button BU3 displayed on the keyboard screen SC1 on the sub touch panel 10. If the switch button BU3 is touched in the standby state in Act 6 and Act 7, i.e., the processor 13 waits for start of registration of the purchased commodity relating to one transaction, the processor 13 takes Yes in Act 7 and proceeds to the processing in Act 16 in FIG. 4.

The processor 13 changes the mode flag to the set state in Act 16.

In Act 17, the processor 13 controls the touch panel for customer 1 to display a guidance screen. The guidance screen is used for guiding the customer that the customer is required to perform an operation for registering the purchased commodity. The guidance screen may show an operation required to be performed as the operation for registering the purchased commodity.

The processor 13 controls the touch panel for store clerk 9 to display a standby screen in Act 18. Although contents of the standby screen are not limited, it is assumed that the standby screen is a screen saver, for example. The standby screen does not include an operation element for registering the purchased commodity.

The processor 13 controls the sub touch panel 10 to display a switching screen in Act 19. The switching screen shows a switch button.

Figure 8:
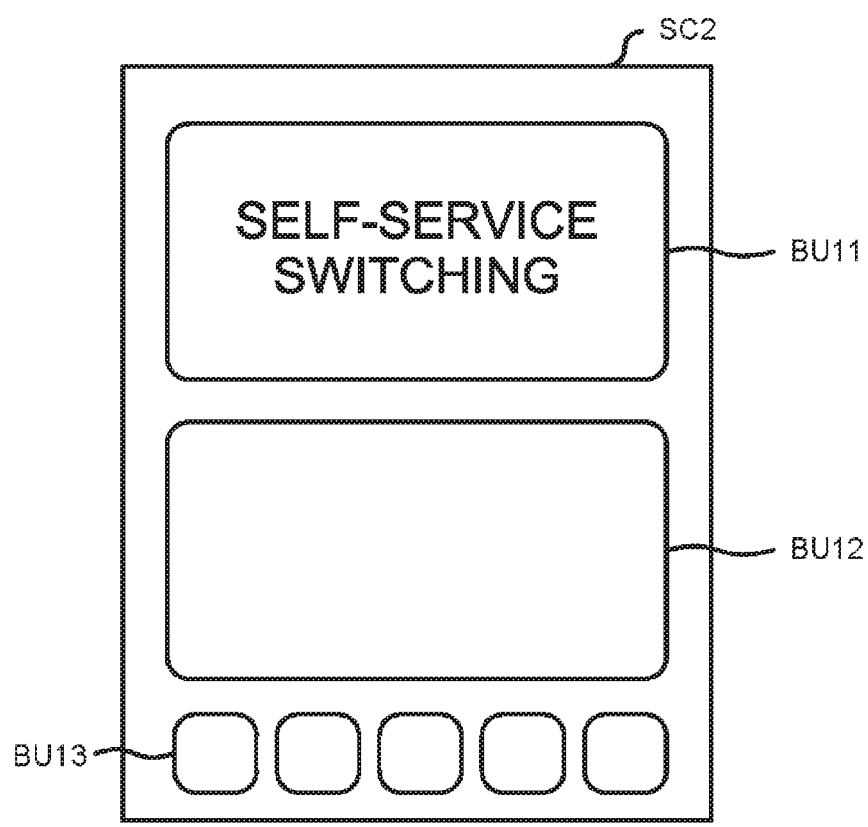
FIG. 8 is a diagram illustrating a switching screen.

FIG. 8 is a diagram illustrating a switching screen SC2.

In the switching screen SC2, a plurality of buttons such as a switch button BU11 and buttons BU12 and BU13 are arranged. Although no reference numeral is denoted, those shown in the same shape as the button BU13 are all buttons.

Functions are assigned to the respective buttons on the switching screen SC2 in advance. The function for instructing switching to the semi-self-service mode by the operator is assigned to the switch button BU11. On the switch button BU11, a character string "self-service switching" is shown to indicate the assigned function. Although a character string indicating the function assigned to each of the other buttons is actually shown also in the corresponding button, the character string is not illustrated in FIG. 8. The switching screen SC2 does not include an operation element for registering the purchased commodity.

The switch button BU11 has a larger display area than the switch button BU3 on the keyboard screen SC1. This is because the number of operations to be performed by the store clerk on the sub touch panel 10 in the full-self-service mode is smaller than that in the semi-self-service mode, the number of buttons required to be shown on the switching screen SC2 is also small, and thus the larger area to show the switch button BU11 can be arranged.

The processor 13 determines whether or not the commodity to be registered as the purchased commodity is designated in Act 20. Then, if no commodity is designated, the processor 13 takes No and proceeds to the processing in Act 21.

In Act 21, the processor 13 determines whether or not the switch button BU11 is touched. Then, if it is determined that the switch button BU11 is not touched, the processor 13 takes No and thus returns to the processing in Act 20.

Thus, the processor 13 stands by until the commodity is designated in Act 20 or the switch button BU11 is touched in Act 21.

If the store clerk wants to set the operation mode of the POS terminal 100 to the semi-self-service mode, the store clerk touches the switch button BU11 shown on the switching screen SC2 on the sub touch panel 10. If the switch button BU11 is touched in the standby state in Act 20 and Act 21, i.e., the processor 13 waits for the start of registration of the purchased commodity for one transaction, the processor 13 takes Yes in Act 21 and proceeds to the processing in Act 22.

In Act 22, the processor 13 changes the mode flag to the reset state. Then, the processor 13 executes the processing subsequent to Act 3 in FIG. 3 in the same manner as described above.

The customer who brings the commodity to the checkout counter performs an operation for designating the commodity as the purchased commodity using the touch panel for customer 1 or the fixed scanner 2. The operation performed by the customer at this time may be the same as that performed in another existing self-type POS terminal. If a commodity is designated as the purchased commodity, the processor 13 takes Yes in Act 20 and proceeds to the processing in Act 23 in FIG. 5.

Since the standby screen does not include the operation element for registering the purchased commodity as described above, the operation for designating the commodity as the purchased commodity is not performed on the touch panel for store clerk 9. Even if the keyboard 11 is operated, the processor 13 does not accept such an operation as the designation of the purchased commodity. Since the switching screen SC2 does not include the operation element for registering the purchased commodity as described above, the operation for designating the commodity as the purchased commodity is not performed on the sub touch panel 10. In other words, the processor 13 disables the touch panel for store clerk 9, the sub touch panel 10 and the keyboard 11 in the full-self-service mode. By disabling the touch panel for store clerk 9, the sub touch panel 10 and the keyboard 11 in this way, it can be prevented that the purchased commodity is erroneously registered by the operation performed by the store clerk.

The processor 13 determines whether or not the commodity designated as the purchased commodity is a commodity that is prohibited from being registered by the operation performed by the customer (hereinafter, referred to as a registration prohibition commodity) in Act 23. For example, any commodity maybe determined as the registration prohibition commodity by an administrator of the POS terminal 100. For example, it is assumed that the commodity such as alcoholic beverages for which a purchaser is restricted by age is set as the registration prohibition commodity. Alternatively, it is assumed that the registration prohibition commodity is a commodity that requires a special operation for discount. For example, a list of commodity codes of the registration prohibition commodities is stored in advance in the main storage unit 14 or the auxiliary storage unit 15. If the commodity code of the commodity designated as the purchased commodity is contained in the list, the processor 13 determines that the designated commodity is the registration prohibition commodity. If the designated commodity is not the registration prohibition commodity, the processor 13 takes No and proceeds to the processing in Act 24.

In Act 24, the processor 13 updates the commodity list to include the commodity designated by the above operation.

The processor 13 controls the touch panel for customer 1 to display a details screen in Act 25. The details screen shows details of the current status for the registration of the purchased commodity according to the contents of the commodity list as of this time. The details screen shows, for example, a list including a commodity name, unit price and quantity of each commodity registered as the purchased commodity, a total discount amount applied to the registered commodities, and a total amount of the registered commodities.

The processor 13 controls the touch panel for store clerk 9 to display a details screen in Act 26. The details screen displayed on the touch panel for store clerk 9 shows that the apparatus is in the full-self-service mode in addition to the information the same as that displayed in Act 10. The details screen displayed on the touch panel for store clerk 9 does not include an operation element for registering the purchased commodity.

If the designated commodity is the registration prohibition commodity, the processor 13 takes Yes in Act 23 and proceeds to the processing in Act 27.

The processor 13 controls the touch panel for customer 1 to display a notification screen in Act 27.

FIG. 9 is a diagram illustrating a notification screen SC3.

The notification screen SC3 shows character strings in four lines. The character string in the first line indicates a commodity name of the commodity designated just before. The character string in the second line indicates a message for notifying the customer that the operation by the store clerk is required to deal with the purchase of the commodity designated just before. The character string in the third line indicates a message for notifying the customer to touch the settlement button on the details screen after designation of a remaining commodity if there is the remaining commodity that is not designated yet. The character string in the fourth line indicates a message for notifying the customer that the store clerk deals with the commodity after touching the settlement button.

The processor 13 sets a withholding flag in Act 28.

After the processing in Act 26 or Act 28 is terminated, the processor 13 proceeds to the processing in Act 29.

In Act 29, the processor 13 determines whether or not the commodity to be registered as the purchased commodity is designated. Then, if no commodity is designated, the processor 13 takes No and proceeds to the processing in Act 30.

In Act 30, the processor 13 determines whether or not the settlement is instructed. Then, if it is determined that the settlement is not instructed, the processor 13 takes No and thus returns to the processing in Act 29.

Thus, the processor 13 stands by until the commodity is newly designated in Act 29 or the settlement is instructed in Act 30.

In a case in which the customer brings a plurality of commodities to the checkout counter, the customer performs the operation for designating the second and subsequent commodities as the purchased commodities at the time the processor 13 is in the standby state in Act 29 and Act 30. If such an operation is performed, the processor 13 takes Yes in Act 29 and executes the processing subsequent to Act 23 in the same manner as described above. As a result, a plurality of commodities that the customer brings to the checkout counter is added to the commodity list, respectively.

Since the details screen displayed on the touch panel for store clerk 9 does not include the operation element for registering the purchased commodity as described above, the operation for designating the commodity as the purchased commodity is not performed through the touch panel for store clerk 9. Even if the keyboard 11 is operated, the processor 13 does not accept the operation as the designation of the purchased commodity. Since the switching screen SC2 does not include the operation element for registering the purchased commodity as described above, the operation for designating the commodity as the purchased commodity is not performed through the sub touch panel 10.

Thus, the processor 13 determines the commodity as an object of the settlement in response to the operation performed by the customer who acts as the first operator. Thus, the processor 13 executes the information processing by executing the information processing program, and in this way, the computer having the processor 13 as the central component functions as a first determination module that makes the above determination.

If all of the commodities brought to the checkout counter are designated as the purchased commodities, the customer instructs settlement by performing a predetermined operation on the touch panel for customer 1. The customer also instructs settlement in the same manner even if there is a commodity the registration of which is temporarily withheld according to the guidance screen. The predetermined operation is, for example, the touch on the settlement button included in the details screen displayed on the touch panel for customer 1. In response to the execution of the corresponding operation, the processor 13 takes Yes in Act 30 and proceeds to the processing in Act 31.

In Act 31, the processor 13 determines whether or not the withholding flag is in the set state. Then, if the withholding flag is in the set state, the processor 13 takes Yes and proceeds to the processing in Act 32.

In Act 32, the processor 13 executes a call operation for calling the store clerk. The call operation is, for example, display of a call screen on the touch panel for store clerk 9, lighting or blinking of the lamp 12, sounding of the buzzer 17, or the like. The processor 13 controls the touch panel for store clerk 9, the lamp 12 and the buzzer 17 to execute at least one of those operations. The call screen indicates that the operation by the store clerk is required to deal with the registration of the registration prohibition commodity.

FIG. 10 is a diagram illustrating a call screen SC4.

The call screen SC4 displays character strings in two lines and a button BU21. The character string in the first line indicates a message for notifying the store clerk that there is a commodity registration of which is withheld in the full-self-service mode. The character string in the second line indicates a message for notifying the store clerk that the commodity registration of which is withheld is required to be additionally registered by an operation in the semi-self-service mode. A function for instructing switching to the semi-self-service mode by the operator (store clerk) is assigned to the button BU21.

In Act 33, the processor 13 waits for an instruction to switch to the semi-self-service mode. For example, when the button BU21 displayed on the call screen SC4 is touched, the processor 13 determines that the instruction is performed. Then, in this case, the processor 13 proceeds to the processing in Act 34.

In Act 34, the processor 13 resets the mode flag. After that, the processor 13 proceeds to the standby state in Act 6 and Act 7 in FIG. 3. In other words, the processor 13 shifts to a state to receive an additional commodity designation in the semi-self-service mode. At this time, the processor 13 does not clear the commodity list. Therefore, at the time of executing the processing in Act 8 thereafter, the processor 13 updates the commodity list created in the full-self-service mode. In other words, the processor 13 takes over the commodity list even if the operation mode is switched.

As described above, the processor 13 enables either one of the determination on the commodity according to the operation by the customer who acts as the first operator and the determination on the commodity according to the operation by the store clerk who acts as the second operator. Then, when the processor 13 performs the determination on the commodity in response to the operation by the customer who acts as the first operator, the processor 13 shifts to a state in which the determination on the commodity is performed according to the operation by the store clerk in response to the instruction from the store clerk who acts as the second operator. Thus, the processor 13 executes the information processing by executing the information processing program, and in this way, the computer having the processor 13 as the central component functions as a determination control module.

If the withholding flag is in a reset state when the customer instructs settlement, the processor 13 takes No in Act 31 and proceeds to the processing in Act 35.

The processor 13 controls the touch panel for customer 1 to display a selection screen the same as that shown in Act 13 in Act 35.

In Act 36, the processor 13 determines whether or not a settlement method is designated. Then, if the settlement method is not designated, the processor 13 takes No and proceeds to the processing in Act 37.

In Act 37, the processor 13 determines whether or not the return to the registration of the purchased commodity is instructed. Then, if the return to the registration of the purchased commodity is not instructed, the processor 13 takes No and thus returns to the processing in Act 36.

Thus, the processor 13 stands by until the settlement method is designated in Act 36 or the return to the registration is instructed in Act 37.

In a case in which the customer wants to add the purchased commodity, the customer instructs to return to the registration by performing a predetermined operation on the touch panel for customer 1. The predetermined operation is, for example, the touch on the return button displayed on the selection screen. The processor 13 takes Yes in Act 37 in response to the execution of the corresponding operation, and executes the processing subsequent to Act 25 in the same manner as described above.

At the time of settlement, the customer designates the settlement method to be used by performing a predetermined operation on the selection screen. The predetermined operation is, for example, a touch on the button, displayed on the selection screen, which is associated with the settlement method to be used. The processor 13 takes Yes in Act 36 in response to the execution of the corresponding operation, and proceeds to the processing in Act 38 in FIG. 6.

Figure 6:
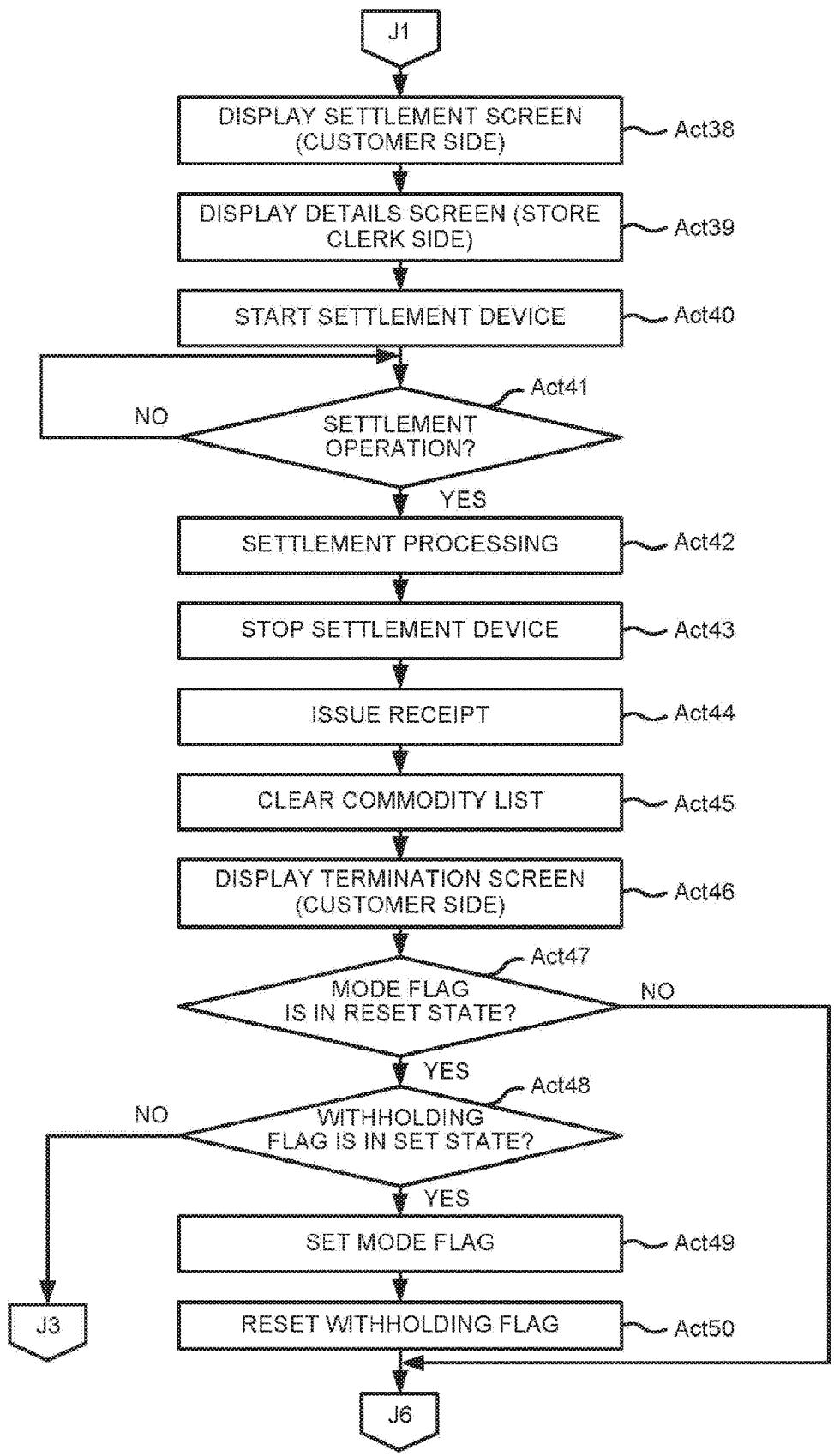
FIG. 6 is a flowchart depicting information processing performed by the processor in FIG. 2.

As described above, the processor 13 proceeds to the processing in Act 38 in FIG. 6 if it is determined that the settlement method is designated in Act 14 in FIG. 3 at the time the POS terminal 100 is in the semi-self-service mode and in Act 36 in FIG. 5 at the time the POS terminal 100 is in the full-self-service mode.

The processor 13 controls the touch panel for customer 1 to display a settlement screen in Act 38. The settlement screen displays an amount to be settled and guidance of an operation for settlement. A plurality of types of the settlement screens corresponding to the plurality of settlement methods is prepared. The processor 13 controls the touch panel for customer 1 to display a settlement screen corresponding to the designated settlement method. Therefore, at the time of displaying the settlement screen, the processor 13 determines a settlement amount for the purchased commodities registered in the commodity list.

In Act 39, the processor 13 controls the touch panel for store clerk 9 to display the details screen. The details screen may be the same as that displayed in Act 10 or Act 26. However, the details screen displayed in Act 39 shows that the customer is performing settlement.

In Act 40, the processor 13 starts a settlement device corresponding to the designated settlement method. For example, if a cash payment is designated as a settlement method, the processor 13 starts the coin unit 3 and the bill unit 4. If a credit payment is designated as a settlement method, the processor 13 starts the credit card reader 5. If an electronic money payment is designated as a settlement method, the processor 13 starts the near field communication unit 6. If a prepaid card payment is designated as the settlement method, the processor 13 starts the prepaid card reader/writer 7.

In Act 41, the processor 13 stands by until the settlement operation corresponding to the designated settlement method is performed. For example, if the cash payment is designated as the settlement method, the processor 13 takes Yes when coins and/or bills are respectively inserted in the coin unit 3 and/or the bill unit 4. If the credit payment is designated as the settlement method, the processor 13 takes Yes when a credit card is slid through the slit 5*a* of the credit card reader 5. If the electronic money payment is designated as the settlement method, the processor 13 takes Yes when a wireless tag for the electronic money is held close to the near field communication unit 6. If the prepaid card payment is designated as the settlement method, the processor 13 takes Yes when a prepaid card is inserted in the slot 7*a* of the prepaid card reader/writer 7. Then, if Yes is taken, the processor 13 proceeds to the processing in Act 42.

The processor 13 performs the settlement processing in Act 42. Specifically, the processor 13 executes the settlement processing on the settlement amount determined in Act 38 by the designated settlement method, for example, just as a known processing in an existing POS terminal. Thus, the processor 13 executes the information processing by executing the information processing program, and in this way, the computer having the processor 13 as the central component functions as a settlement module.

The processor 13 performs settlement processing on the settlement amount determined based on the commodity list at the time of executing the processing in Act 38 in FIG. 6. The processor 13 starts updating the commodity list if it is determined that the commodity is designated in Act 6 in FIG. 3, or if it is determined that the commodity that is not the registration prohibition commodity is designated in Act 20 in FIG. 4 and Act 23 in FIG. 5. In other words, the processor 13 sets that period as a registration period and creates a list of commodities determined as commodities in one transaction within the registration period. Thus, the processor 13 executes the information processing by executing the information processing program, and in this way, the computer having the processor 13 as the central component functions as a creation module.

In Act 43, the processor 13 stops the settlement device started in Act 40.

In Act 44, the processor 13 controls the receipt printer 8 to issue a receipt obtained by printing a receipt image indicating contents of the transaction on which the settlement is performed this time and the settlement result on a receipt paper.

In Act 45, the processor 13 clears the commodity list.

In Act 46, the processor 13 controls the touch panel for customer 1 to display a termination screen. The termination screen notifies the customer of completion of the transaction.

In Act 47, the processor 13 determines whether or not the mode flag is in a reset state. Then, if the mode flag is in the reset state, the processor 13 takes Yes and proceeds to the processing in Act 48.

In Act 48, the processor 13 determines whether or not the withholding flag is in the set state. Then, if the withholding flag is in a reset state, the processor 13 takes No and thus returns to the processing in Act 3 in FIG. 3. Specifically, although the semi-self-service mode is being set, if the semi-self-service mode is not set by switching from the full-self-service mode for the purpose of dealing with the registration prohibition commodity, the processor 13 stands by until a commodity of a next transaction is designated in a state in which the semi-self-service mode is continued, or until the switching to the full-self-service mode is instructed.

If the withholding flag is in the set state, the processor 13 takes Yes in Act 48 and proceeds to the processing in Act 49.

In Act 49, the processor 13 sets the mode flag.

In Act 50, the processor 13 resets the withholding flag.

After that, the processor 13 executes the processing subsequent to Act 17 in FIG. 4 in the same manner as described above. If the mode flag is in the set state, the processor 13 takes No in Act 47, and then executes the processing subsequent to Act 17 in FIG. 4 in the same manner as described above without executing the processing in Act 48 to Act 50. Specifically, if the semi-self-service mode is set by switching from the full-self-service mode for the purpose of dealing with the registration prohibition commodity, the processor 13 stands by until a commodity of a next transaction is designated or until the switching to the semi-self-service mode is instructed after returning to the full-self-service mode. If the full-self-service mode is being set, the processor 13 stands by until a commodity of a next transaction is designated in the full-self-service mode or until the switching to the semi-self-service mode is instructed.

The processor 13 performs control to display an error screen for notifying that maintenance is required if a case requiring maintenance by the store clerk such as replacement of a receipt paper or replenishment or collection of currency occurs. The processor 13 controls the touch panel for store clerk 9 to display an error screen for the store clerk at the time the mode flag is in the reset state, i.e., the semi-self-service mode is set. The store clerk performs maintenance according to the error screen. At the time the mode flag is in the set state, i.e., the full-self-service mode is set, the processor 13 controls the touch panel for customer 1 to display an error screen for the customer. Furthermore, in the full-self-service mode, the processor 13 also controls the touch panel for store clerk 9 to display an error screen for the store clerk. The error screen for the store clerk includes a cancel key for canceling the display of the error screen. The customer calls the store clerk according to the display on the error screen for the customer. The store clerk called by the customer confirms circumstances based on the error screen for the store clerk, performs maintenance as appropriate, and then instructs cancellation of the display of both error screens using the cancel key. The processor 13 cancels the display of both error screens in response to the instruction.

As described above, according to the POS terminal 100 of the present embodiment, the processor 13 performs settlement and related processing by executing the processing in Act 13 to Act 15 and Act 38 to Act 46 after registration of the purchased commodity in Act 3 to Act 12. Thus, the registration is performed in response to the operation performed by the store clerk and the settlement is performed in response to the operation performed by the customer, to realize the semi-self-service mode. The processor 13 performs settlement and related processing by executing the processing in Act 32 to Act 46 after registration of the purchased commodity in Act 17 to Act 30. As a result, both the registration and the settlement are performed in response to the operation performed by the customer, to realize the full-self-service mode. Then, the processor 13 switches the operation mode between the semi-self-service mode and the full-self-service mode in response to the touch operation on the switch button BU3 or the switch button BU11. Thus, the POS terminal 100 can easily switch the operation mode from the full-self-service mode to the semi-self-service mode and vice versa.

Furthermore, according to the POS terminal 100, if the commodity designated by the customer is a commodity that is prohibited to be registered by the operation performed by the customer in a state in which the full-self-service mode is set, it is permitted to switch to the semi-self-service mode while the registration for the transaction is being performed. Then, after the operation mode is switched to the semi-self-service mode, the registration of a new commodity is performed in response to the operation performed by the store clerk to add the commodity to the commodity list created until now. Thus, the registration for the transaction can be completed without starting over from the beginning. In other words, the operation mode of the POS terminal is easily switched from the full-self-service mode to the semi-self-service mode, and thus the registration prohibition commodity can be promptly registered through the operation performed by the store clerk.

Furthermore, according to the POS terminal 100, the registration of the registration prohibition commodity by the customer is temporarily withheld, and the switching to the semi-self-service mode is performed after the registration of all commodities that can be registered by the customer is completed. Therefore, the burden on the store clerk in the commodity registration work can be minimized.

According to the POS terminal 100 of the present embodiment, the operation mode is switched to the semi-self-service mode in response to the operation on the button BU21 shown on the call screen SC4 for indicating that the operation by the store clerk is required to deal with the registration of the registration prohibition commodity, and thus, the operation by the store clerk for switching the operation mode can be simplified.

If the semi-self-service mode is set to deal with the registration prohibition commodity, the POS terminal 100 automatically returns to the full-self-service mode after the settlement by the store clerk is completed. Thus, the store clerk is not required to perform the operation for changing the operation mode. As a result, the burden of the operation on the store clerk can be reduced, and occurrence of a state in which the store clerk forgets switching of the operation mode to the full-self-service mode and thus a subsequent customer cannot start new registration can be prevented.

According to the POS terminal 100, since the registration of the purchased commodity is not performed in response to the operation on the touch panel for customer 1 and the fixed scanner 2 in the semi-self-service mode, it can be prevented that the purchased commodity is erroneously registered in response to the operation by the customer.

According to the POS terminal 100, since the registration of the purchased commodity is not performed in response to the operation on the touch panel for store clerk 9, the sub touch panel 10 and the keyboard 11 in the full-self-service mode, it can be prevented that the purchased commodity is erroneously registered in response to the operation by the store clerk.

The present embodiment is modified as follows.

The processor 13 may stand by until the switching to the semi-self-service mode is instructed in the same manner as in Act 33 if Yes is taken in Act 23 in FIG. 5 because the designated commodity is the registration prohibition commodity. Then, the processor 13 shifts to the standby state in Act 11 and Act 12 in FIG. 3 when the switching is instructed.

The processor 13 may determine whether or not the switch button BU3 is touched in the same manner as in Act 7 in the standby state in Act 11 and Act 12 in FIG. 3. Then, if the switch button BU3 is touched, the processor 13 enters the standby state in Act 29 and Act 30 in FIG. 5. In this way, at any timing at which the registration of the commodity in the semi-self-service mode is performed, the operation mode is switched to the full-self-service mode, and then the registration of the commodity is continued in response to the operation performed by the customer.

The processor 13 may further determine whether or not the switch button BU11 is touched in the same manner as in Act 21 in the standby state in Act 29 and Act 30 in FIG. 5. Then, if the switch button BU11 is touched, the processor 13 enters standby state in Act 11 and Act 12 in FIG. 3. In this way, at any timing at which the registration of the commodity in the full-self-service mode is performed, the operation mode is switched to the semi-self-service mode, and then the registration of the commodity is continued in response to the operation performed by the store clerk.

In this modification, the store clerk is called if the registration prohibition commodity is designated in the full-self-service mode, and the store clerk maybe notified that the switch button BU11 is touched.

The present invention is applicable to a registration settlement apparatus of another embodiment such as a cash register in the same manner as the above embodiment.

The switch button for switching the operation mode from the semi-self-service mode to the full-self-service mode and the switch button for switching the operation mode from the full-self-service mode to the semi-self-service mode may be the same button.

The switch button may be displayed on the screen on the touch panel for store clerk 9 or may be provided on the keyboard 11.

In the standby state in Act 29 and Act 30 in FIG. 5, the processor 13 may further standby until the registration of all the commodities except for the registration prohibition commodity is completed. Then, for example, if a button, displayed on the details screen displayed on the touch panel for customer 1, for declaring completion of the registration of all the commodities except for the registration prohibition commodity is touched, the processor 13 may proceed to the processing in Act 35. Then, the processor 13 proceeds to the processing in Act 32 from Act 30 if the settlement is instructed.

The processor 13 may switch the operation mode from the semi-self-service mode to the full-self-service mode only in a person in charge registration state.

The processor 13 may record the switching from the semi-self-service mode to the full-self-service mode in electronic journal at the time of switching from the semi-self-service mode to the full-self-service mode. At this time, the processor 13 may also record a name or identification code of the person in charge in the electronic journal.

The processor 13 may control the touch panel for store clerk 9 or the sub touch panel 10 to display a confirmation screen on which a message such as "switching to the full-self-service mode, OK?" and a "Yes" button and a "No" button are displayed in a pop-up manner at the time of switching from the semi-self-service mode to the full-self-service mode. Then, the processor 13 may switch the operation mode if the "Yes" button is touched, and may not switch the operation mode if the "No" button is touched.

The processor 13 may not switch the operation mode if the coin unit 3 and the bill unit 4 are in an error state of disconnection. In this case, the processor 13 may control the touch panel for store clerk 9 or the sub touch panel 10 to display a screen for displaying a warning message such as "operation mode cannot be switched, change machine is disconnected".

At the time of switching from the semi-self-service mode to the full-self-service mode, the processor 13 may automatically input a predetermined number, for example, such as "999" as a person in charge number.

The processor 13 may turn off an automatic person in charge cancellation function at the time of switching from the semi-self-service mode to the full-self-service mode. The automatic person in charge cancellation function is a function for deleting the person in charge number and automatically canceling the person in charge registration state if no operation is performed for a predetermined period of time.

Before or after the switching from the full-self-service mode to the semi-self-service mode, the processor 13 may control the touch panel for store clerk 9 or the sub touch panel 10 to display a screen for inputting a person in charge number. Then, the processor 13 inputs the person in charge number in response to the operation performed by the store clerk on the screen.

The processor 13 may record the switching from the full-self-service mode to the semi-self-service mode in the electronic journal at the time of switching from the full-self-service mode to the semi-self-service mode. At this time, the processor 13 may also record a name or identification code of the person in charge in the electronic journal.

The processor 13 may control the touch panel for store clerk 9 or the sub touch panel 10 to display a confirmation screen on which a message such as "switching to the semi-self-service mode, OK?" and a "Yes" button and a "No" button are displayed in a pop-up manner at the time of switching from the full-self-service mode to the semi-self-service mode. Then, the processor 13 may switch the operation mode if the "Yes" button is touched, and may not switch the operation mode if the "No" button is touched.

The processor 13 may confirm the states of the coin unit 3 and the bill unit 4 at the time of switching from the full-self-service mode to the semi-self-service mode. The processor 13 may control the touch panel for store clerk 9 or the sub touch panel 10 to display a screen showing a message such as "drawer is in operation" if the error that the coin unit 3 and the bill unit 4 are in disconnected state occurs.

The processor 13 may display a message indicating that the operation mode is the semi-self-service mode on the screen displayed on the touch panel for store clerk 9 in the semi-self-service mode.

The processor 13 may turn on the automatic person in charge cancellation function at the time of switching from the full-self-service mode to the semi-self-service mode.

In the full-self-service mode, the processor 13 may print "self" on the receipt as the person in charge name.

In the full-self-service mode, the processor 13 may record a predetermined number such as "999" in the electronic journal as the person in charge number. Then, in this case, the processor 13 may set the person in charge name at the time of referring to the journal to "self".

The processor 13 may display "self" on the screen displayed on the touch panel for store clerk 9 or the sub touch panel 10 as the person in charge name in the semi-self-service mode.

The processor 13 may prohibit use of the person in charge number used in the full-self-service mode as the person in charge number in the semi-self-service mode.

In the full-self-service mode, the processor 13 may adopt a predetermined customer layer as the customer layer information.

In the semi-self-service mode, the processor 13 may adopt a customer layer corresponding to a customer layer key pressed by the store clerk after registration of the commodity as the customer layer information.

A part or all of the functions performed by the processor 13 executing the information processing may be performed by hardware that executes the information processing not based on a program, such as a logic circuit or the like. Each of the above-described functions may also be performed by combining software control with the above-described hardware such as the logic circuit.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A registration settlement apparatus, comprising:
a first determination module configured to determine a commodity as an object of a transaction in response to an operation performed by a first operator;
a second determination module configured to determine the commodity as an object of the transaction in response to an operation performed by a second operator at another side of the registration settlement apparatus;
a determination control module configured to control the first determination module and the second determination module so as to enable either, and enable the second determination module in response to an instruction from the second operator while the first determination module is enabled within a registration period for one transaction;
a creation module configured to create a list of commodities determined as objects of the transaction within the registration period by the first determination module or the second determination module enabled by the determination control module; and
a settlement module configured to calculate a settlement amount based on the list created by the creation module and perform a settlement processing on the settlement amount in response to an operation performed by the first operator.

2. The registration settlement apparatus according to claim 1, wherein
the creation module does not include the commodity in the list if the commodity determined by the first determination module is a predetermined registration prohibition commodity, and
the determination control module accepts an instruction for enabling the second determination module from the second operator if the commodity determined by the first determination module is the predetermined registration prohibition commodity.

3. The registration settlement apparatus according to claim 2, wherein
the determination control module is configured to continuously enable the first determination module even if the commodity determined by the first determination module is the predetermined registration prohibition commodity, and start to accept the instruction for enabling the second determination module from the second operator in response to the instruction from the first operator.

4. The registration settlement apparatus according to claim 3, wherein
the determination control module enables the first determination module if the settlement module performs the settlement processing after enabling the second determination module in response to the instruction from the second operator if the commodity determined by the first determination module is the predetermined registration prohibition commodity.

5. The registration settlement apparatus according to claim 2, wherein
the determination control module enables the first determination module if the settlement module performs the settlement processing after enabling the second determination module in response to the instruction from the second operator if the commodity determined by the first determination module is the predetermined registration prohibition commodity.

6. The registration settlement apparatus according to claim 1, wherein
the determination control module enables the first determination module in response to an instruction from the second operator while the second determination module is enabled.

7. The registration settlement apparatus according to claim 1, wherein
the first determination module comprises a scanner and the settlement module comprises a credit card reader.

8. The registration settlement apparatus according to claim 1, further comprising:
a visual indicator indicating whether the first determination module or the second determination module is enabled.

9. The registration settlement apparatus according to claim 1, further comprising:
a display comprising a mode switching button operable by the second operator.

10. The registration settlement apparatus according to claim 1, wherein
the registration settlement apparatus is a POS terminal.

11. A method for operating a registration settlement apparatus, comprising:
first determining a commodity as an object of a transaction in response to an operation performed by a first operator;
second determining the commodity as an object of the transaction in response to an operation performed by a second operator at another side of the registration settlement apparatus;
enabling either the first determining and the second determining;
enabling the second determining in response to an instruction from the second operator while the first determining is enabled within a registration period for one transaction;
creating a list of commodities determined as objects of the transaction within the registration period by the enabled first determining or second determining; and
calculating a settlement amount based on the created list.

12. The method according to claim 11, further comprising:
settling the calculated settlement amount in response to an operation performed by the first operator.

13. The method according to claim 12, further comprising:
not including the commodity in the list if the commodity determined by the first determining is a predetermined registration prohibition commodity, and
accepting an instruction for enabling the second determining from the second operator if the commodity determined by the first determining is the predetermined registration prohibition commodity.

14. The method according to claim 13, further comprising:
continuously enabling the first determining even if the commodity determined by the first determining is the predetermined registration prohibition commodity, and starting to accept the instruction for enabling the second determining from the second operator in response to the instruction from the first operator.

15. The method according to claim 14, further comprising:
enabling the first determining if settling is performed after enabling the second determining in response to the instruction from the second operator if the commodity determined by the first determining is the predetermined registration prohibition commodity.

16. The method according to claim 13, further comprising:
enabling the first determining if settling is performed after enabling the second determining in response to the instruction from the second operator if the commodity determined by the first determining is the predetermined registration prohibition commodity.

17. The method according to claim 12, further comprising:
first determination by scanning the commodity and settling by using a credit card reader.

18. The method according to claim 11, further comprising:
enabling the first determining in response to an instruction from the second operator while the second determination module is enabled.

19. The method according to claim 11, further comprising:
visually indicating whether the first determination module or the second determination module is enabled.

20. The method according to claim 11, further comprising:
switching a mode using a mode switching button by the second operator.

* * * * *